July 9, 1957 — G. J. MUCHER — 2,798,926
CONTROL
Filed June 9, 1954 — 2 Sheets-Sheet 1
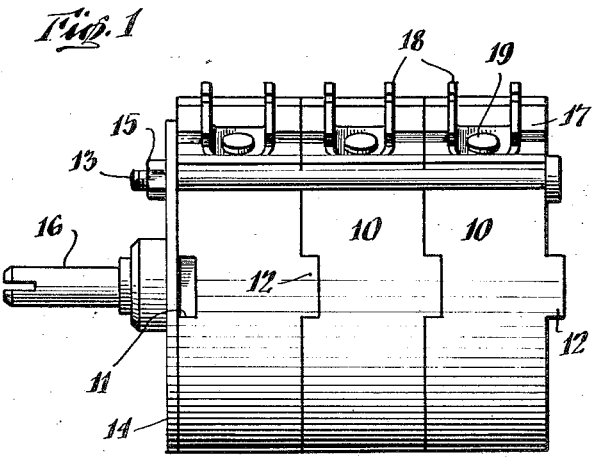
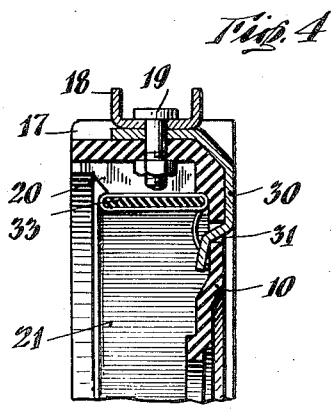
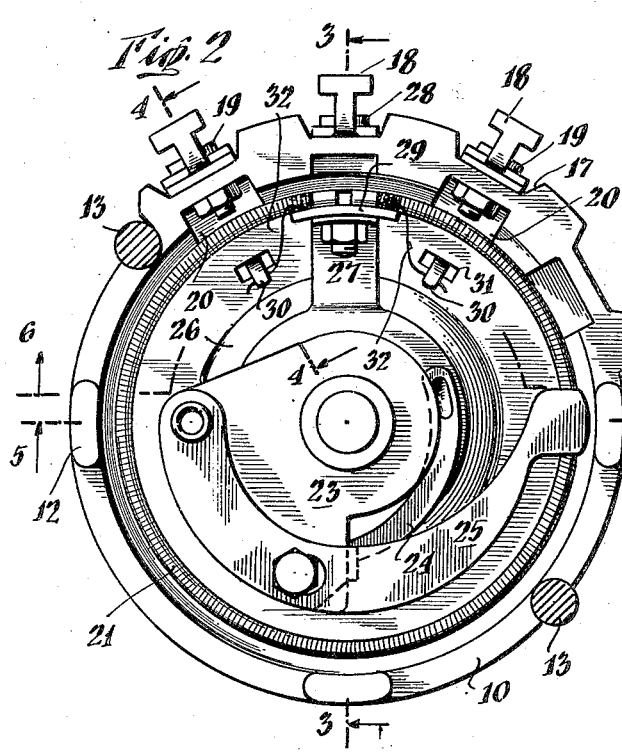
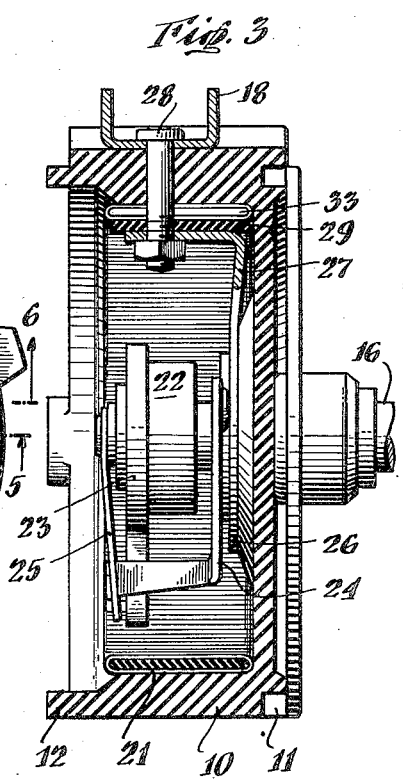
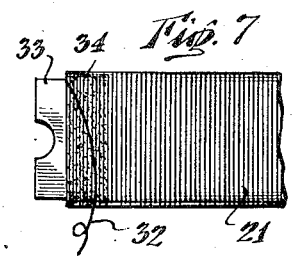
INVENTOR
George J. Mucher
BY
ATTORNEYS

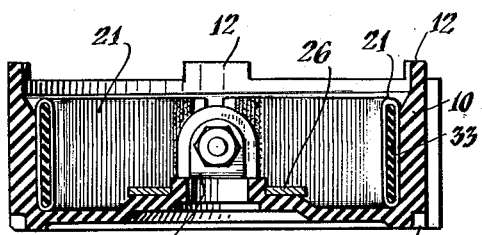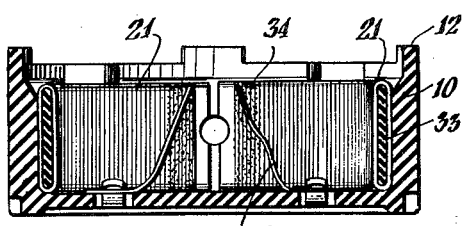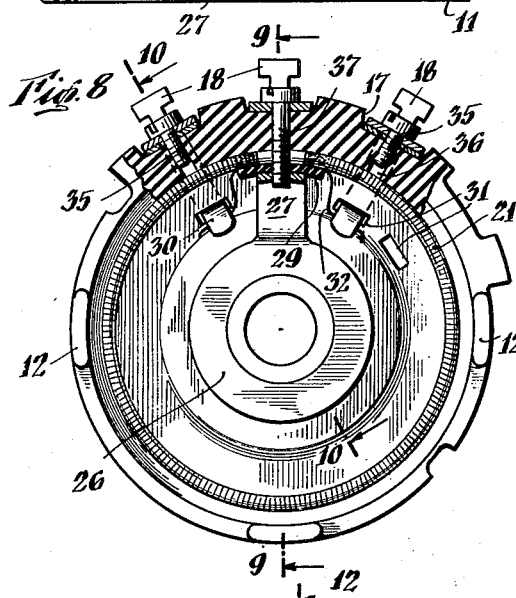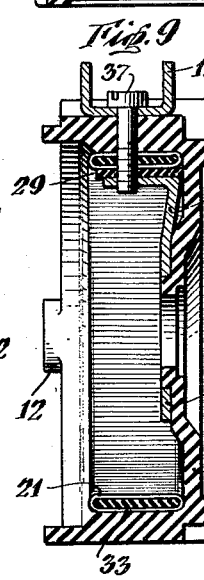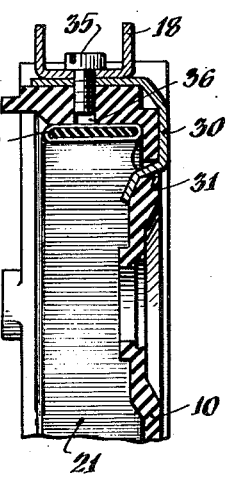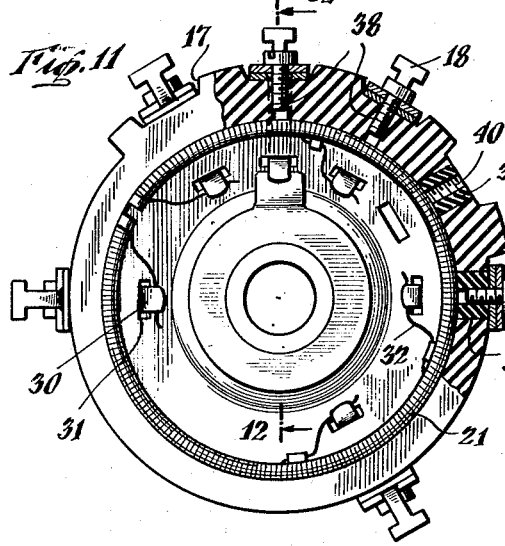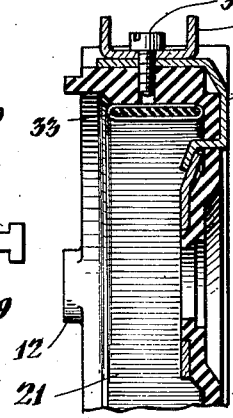

2,798,926
Patented July 9, 1957

2,798,926
CONTROL
George J. Mucher, Rochester, N. H., assignor to Clarostat Mfg. Co., Inc., Dover, N. H., a corporation of New York Application June 9, 1954, Serial No. 435,577

5 Claims. (Cl. 201—48)

This invention relates to a structurally and functionally improved control of the potentiometer or rheostat type; the present application being a continuation in part of my prior application for United States Letters Patent, Serial No. 221,227, now forfeited, filed April 16, 1951.

It is an object to furnish a unit of this nature which may be used singly or together with similar controls in a gang assembly and by means of which proper peripheral spacing of the terminals may be achieved. This will be true, even although the resistance or similar structure to which the terminals are connected, extends either substantially throughout a complete circle, or is just less than 360°.

A further object is that of designing an assembly which will include relatively few parts each individually simple and rugged in design; such parts being capable of ready assemblage by means of relatively unskilled labor to furnish a unit which may be sold at comparatively nominal cost.

An additional object resides in overcoming the technical difficulties present in an assembly involving an axially mounted resistance strip and connecting the same with peripherally mounted terminals without sacrificing arcuate sweep, axial compactness and functional results.

With these and other objects in mind reference is had to the attached sheet of drawings illustrating practical embodiments of the invention and in which:

Fig. 1 shows an assembly of controls embodying the present teachings;

Fig. 2 is a face view of a single control unit with the cover removed to show the enclosed structure;

Figs. 3 to 6 inclusive are transverse sectional views taken respectively along the lines 3—3, 4—4, 5—5, and 6—6 in the direction of the arrows as indicated in Fig. 2;

Fig. 7 is a fragment of the end portion of a resistance such as may be employed in the present assembly;

Fig. 8 is a partly sectional elevation of an alternative form of structure;

Figs. 9 and 10 are transverse sectional views taken along the lines 9—9 and 10—10 in the direction of the arrows as indicated in Fig. 8;

Fig. 11 illustrates an arrangement similar to Fig. 8 but showing a still further form of structure;

Fig. 12 is a transverse sectional view taken along the line 12—12 in the direction of the arrows as indicated in Fig. 11; and Fig. 13 is a perspective view of an element forming a part of the assembly as shown in Fig. 11.

As is well understood by those conversant with potentiometers and similar controls it has been customary to provide a resistance disposed within a di-electric casing usually of circular configuration. Terminals have extended through the end of the resistance strip and the wall of the casing. Beyond the latter they have been connected to suitable leads to control desired circuits. The leads extending from any one unit have usually been at least three in number. In many instances and where the resistance has been tapped at points intermediate its ends, one or more additional terminals have formed a part of the control. In order that complete wiring of the control into the circuit may be achieved with facility, it is necessary that the terminals be spaced an adequate distance from each other to allow an operator to electrically connect the necessary leads with these terminals.

Where a number of control units have been combined to provide a gang assembly such as in a servo mechanism, the question of terminal spacing and separation on each individual unit is complicated in direct ratio to the number of units which form a part of the assembly.

Especially in such a servo mechanism and in similar assemblies where a large number of controls have been combined, it frequently becomes necessary to extend the resistance throughout substantially 360° to furnish a control incorporating the desired electrical ranges and values. So extended it is apparent that if terminals were directly secured through the casing and into the ends of the resistance, these terminals would not be spaced to an extent such that an operator could with facility connect the desired leads to the outer terminal ends. Also the rotor of the control has, in many instances, to be capable of rotating through complete circles. Under these circumstances it is apparent that no interference must occur between portions of the resistance and its terminals or taps and the contact arm carried by the rotor which would prevent such rotation of the parts.

No solution is to be found by simply arranging and spacing the terminals a desired distance. This is because the control is limited both with respect to its overall dimensions as well as its depth, especially where that control forms a part of a mechanism of the type aforementioned. In the case of a control involving an effective resistance unit extending through 340° difficulties are also experienced. This is because the last ten degrees, for example, adjacent the end of the resistance strip, are shorted out. Therefore to have a resistance which is effective throughout 340° it is apparent that the strip may extend throughout 360°. Accordingly complications are encountered in soldering leads to terminals extending beyond the casing, because the latter, if mounted in line with the shorted end portions of the strip, would extend immediately adjacent each other beyond the casing of the device.

The present invention overcomes these difficulties by a structure such as is illustrated in the accompanying drawings. Referring primarily to Figs. 1 to 6 inclusive, the numeral 10 indicates a cup-shaped casing having limited diameter and depth. This is formed ordinarily of a suitable di-electrical material and may incorporate in its one face any desired number of notches 11, while in its other face a corresponding number of mating projecting portions 12 are provided. These are furnished so that any desired number of controls may be assembled by connecting their casing portions in the manner indicated in Fig. 1 with the projecting parts 12 of one extending into the notches or recesses 11 of an adjacent casing. The several units are maintained against displacement by, for example, bolts 13 which may pass through a metallic backing plate 14 and have associated with them nuts 15. In the case of a gang assembly, a single operating shaft 16 is provided common to the several units.

The peripheral edge of saddle or supporting portions 17, providing mounting surfaces for terminals 18, extend beyond the casing rim and those terminals are secured in position by bolts 19. These portions are spaced a distance such that the mounted terminals are separated from each other to an adequate extent to permit of the connection therewith of suitable leads by soldering or otherwise. As shown especially in Figs. 2 and 4, the outermost of the terminals 18 are mounted by bolts 19 which have limited length and extend merely into pockets 20 formed in the inner peripheral face of the casing in line with the saddles or mounting surfaces 17, while the other bolts have greater length.

A resistance 21 is disposed axially within the casing. This resistance has been shown as a wire wound insulating strip extending throughout substantially 360°. It is apparent that other forms of resistances might be employed which could have any desired arcuate length. Shaft 16 has secured to it a rotor including, for example, a hub 22 mounting an insulating plate 23. The latter in turn mounts a contact arm 24 and a resistance-traversing arm 25. Arm 24 passes over the surface and in electrical contact with ring 26. Arm 25 engages and moves over the outer edge portion of resistance strip 21. The foregoing is to be regarded as merely illustrative; it being understood that the rotor assembly may involve any desired and proper arrangement of parts.

Ring 26 is preferably provided with an extension or strap 27 connected to the inner end of a bolt and nut assembly 28 conveniently extending from the central terminal 18 as shown in these views. That bolt passes through the extension or strap 27 and may also pass through an insulating layer 29 and clamp the adjacent ends of resistance 21 to the inner face of the casing periphery. It is thus obvious that current may flow, for example, from the resistance through contact arm 25 and arm 24 to ring 26. From the latter it may flow through the strap or extension 27 and thence through bolt 28 to the terminal connected therewith. That terminal, as aforebrought out, will customarily and more desirably be the central terminal of a grouping of three. Where a number of resistance taps are provided intermediate the ends of the resistance strip, then this unit (which might be termed the rotor terminal) may assume any proper position within the grouping of terminals.

In any event from each of the side terminals 18 a connection exists preferably to points adjacent the ends of the resistance. This connection may include numerous different structures. However, in accordance with the present teachings it will preferably embrace a lead strip 30 having one of its ends secured in electrical connection with the desired terminal 18 by, for example, the bolt 19 of the latter. This lead strip will extend within a recess formed on the rear face of the casing so as not to project beyond that casing face. It will be threaded through an opening 31 formed in the casing wall and be connected in any desired manner to a wire 32.

That wire may form a part of the end zone of resistance 21. As shown in Fig. 7 a strip 33 preferably of insulating material conveniently provides the mounting or foundation of the resistance element. The strip 33 as shown may have windings applied around it. Adjacent its ends a certain zone of these windings is preferably shorted out so that throughout this end zone a common electrical value exists. Such shorting out may be achieved by applying a spray of solder or otherwise providing a coating 34 having high conductivity adjacent the end zones of the strip. The end wire 32 of the winding may extend across and even be embedded in this coating. As shown especially in Figs. 2 and 6, where the resistance element extends throughout an arc such that its ends are closely adjacent each other, the wires 32 will project from those ends in directions turned back upon and generally towards the center of the resistance strip. They will be connected one to each of the lead strips 30. Accordingly, the outside terminals 18, as shown in Fig. 2, will electrically define the ends of the resistance.

Ordinarily, the resistance 21 will require no auxiliary support throughout the zone of recesses or pockets 20. In other words it will extend in supporting relationship in contact with the inner peripheral face of the casing and not need any bracing throughout the limited zones of these pockets. However, should such additional support be desired, then these pockets may be filled with any proper di-electric material in order to engage against the outer resistance face. In order not to complicate unduly the present illustrations no taps of the resistance intermediate its end zones have been shown in Figs. 1 to 7. As will be understood, however, any desired number of taps could be made at points properly spaced from the end zones and these taps could be defined by leads in accordance with conventional practice. Those leads, would, pursuant to the teachings of the present invention, be connected to terminals suitably supported upon mounting surfaces. One of these has been shown to the right of the last terminal 18 in Fig. 2, it being understood that further saddle or mounting surfaces could be furnished beyond this point.

As a consequence of the foregoing construction, it will be understood that the difficulties heretofore enumerated are overcome. Even when the ends of the resistance strip are immediately adjacent each other, it is still feasible to separate the terminals to any desired and proper distance. These terminals will extend peripherally and not from one of the side faces or otherwise from a surface of the casing. Therefore, a gang assembly of units having limited depths and diameters may be combined, for example, in a Servo mechanism with adequate spacing for the accommodation of the several leads to be connected to the terminals.

As illustrated in Figs. 8, 9 and 10, the bolts 35 mounting the terminals defining the end of the resistance path may have their threads engaging correspondingly threaded bores 36 formed directly in the body of the cup or mounting member embraced within the control assembly. As shown in Fig. 9 the bolt 37 which serves to anchor the ends of resistance 21, also mounts the terminal 27 directly connected to ring 26 and conveniently extends through an opening in the resistance. This opening embraces, for example, semicircular recesses in the ends of the mounting strip. Bolts 35, of course, terminate—when fully seated—at points short of the resistance strip. These latter bolts, as previously described, mount connecting strips or leads such as 30 suitably coupled to the ends of the resistance path. The leads defining this connection, as shown in Fig. 8, extend away from the ends of the resistance strip.

Relatively short bolts 38 may also be employed as in Figs. 11 and 12. However, instead of forming the cup or base with threaded openings at each point that a bolt is to be mounted, certain or all of these openings may be of sufficient area to receive expansible split sleeves 39, one of which has been shown in Fig. 13. Such sleeves or bushings are formed with central bores or openings 40 which are either initially threaded or have threads formed in them incident to the introduction of the bolt shanks. In either event, as the bolts are mounted, the bushings will be expanded to be firmly anchored against movement with respect to the cup or base member. In this connection it will be appreciated that the outer face of the bushing may be preferably roughened to assure of a firm gripping between the surfaces of the parts.

Thus, among others, the several objects of the invention as specifically aforenoted are achieved. Obviously numerous changes in construction and rearrangement of the parts might be resorted to without departing from the spirit of the invention as defined by the claims.

I claim:

1. A control including in combination a cup-shaped casing formed with recesses in its inner peripheral face, outwardly extending integral mounting portions upon its outer peripheral face in line with said recesses, terminals disposed upon the outer faces of said mounting portions, securing means extending in retaining engagement with said terminals through the periphery of said cup into said recesses and terminating short of the inner peripheral face, a resistance disposed around and in contact with that face of said casing and extending across and closing said recesses at points spaced from said securing means, the base of said casing being formed with openings and channels at points short of the ends of the resistance and leads extending from the resistance ends through said openings and channels to said terminals.

2. A control including in combination a cup-shaped casing formed with recesses in its inner peripheral face, outwardly extending integral mounting portions upon its outer peripheral face in line with said recesses, terminals disposed upon the outer faces of said mounting portions, securing means extending in retaining engagement with said terminals through the periphery of said cup into said recesses and terminating short of the inner peripheral face, a resistance disposed around and in contact with that face of said casing and extending across and closing said recesses at points spaced from said securing means, the base of said casing being formed with openings at points short of the ends of the resistance, the outer face of said base being relatively recessed from points adjacent said openings to points adjacent the terminal mounting portions and leads connected to said terminals and extending in contact with the recessed face through said openings in electrical connection with the ends of said resistance.

3. A control including in combination a plurality of cup-shaped casings disposed in axial alignment and provided with inter-engaging recesses and projecting portions such that the several casings are prevented from rotating with respect to each other, means for maintaining the inter-engagement of said casings, the base portions of each of said casings being formed with spaced openings extending from their interiors to their outer faces and with channels in such outer faces extending from said openings through to the periphery of each casing, terminals mounted upon the outer peripheral faces of said casings, a resistance strip supported in contact with the inner peripheral face of each casing and extending throughout substantially a complete circle, means securing the ends of said strip against displacement with respect to said casing and extending beyond the periphery of the latter, said openings and channels being spaced to either side of said securing means, said terminals being likewise spaced to each side of said securing means and connecting means extending from said terminals through said channels and openings within the boundaries of a given casing in non-interfering relationship with the surfaces of an adjacent casing and inwardly in the direction of said securing means toward the ends of a resistance associated with said strip.

4. A control including in combination a cup-shaped casing formed with openings between its inner and outer peripheral faces, expandible resilient means defining bores with said openings, terminals disposed on the outer peripheral face of said casing, securing means extending in retaining engagement with said terminals through the bores defined by said expandible means and terminating short of the inner peripheral face of said casing, a resistance disposed around and in contact with the inner peripheral face of said casing and extending across and closing the bores at points spaced from said securing means, the base of said casing being formed with openings and channels at points short of the ends of the resistance, strips connected to said terminals and extending through said openings and channels and leads extending from said resistance ends to said strips.

5. In a control as in claim 4, said expandible resilient means comprising a split sleeve, whereby said sleeve is frictionally engaged within said opening as said securing means is associated with said sleeve.

References Cited in the file of this patent

UNITED STATES PATENTS

| | | |
|---|---|---|
| 1,926,206 | Lodge | Sept. 12, 1933 |
| 2,019,997 | Schellenger | Nov. 5, 1935 |
| 2,138,210 | Schellenger | Nov. 29, 1938 |
| 2,141,907 | Hathorn | Dec. 27, 1938 |
| 2,266,188 | Foley et al. | Dec. 16, 1941 |
| 2,434,248 | Mucher | Jan. 13, 1948 |
| 2,572,651 | Mucher | Oct. 23, 1951 |
| 2,599,934 | Opocensky | June 10, 1952 |

FOREIGN PATENTS

| | | |
|---|---|---|
| 897,587 | France | Mar. 26, 1945 |